(12) United States Patent
Lee et al.

(10) Patent No.: US 9,644,078 B2
(45) Date of Patent: May 9, 2017

(54) RELEASE FILM AND METHOD FOR MANUFACTURING THE SAME

(75) Inventors: Eokhyung Lee, Chungcheongbuk-do (KR); Jangsoon Kim, Gyeonggi-do (KR); Youngsun An, Gyeonggi-do (KR)

(73) Assignee: LG Hausys, Ltd., Seoul (KR)

( * ) Notice: Subject to any disclaimer, the term of this patent is extended or adjusted under 35 U.S.C. 154(b) by 956 days.

(21) Appl. No.: 13/505,571

(22) PCT Filed: Dec. 29, 2010

(86) PCT No.: PCT/KR2010/009499
§ 371 (c)(1),
(2), (4) Date: May 2, 2012

(87) PCT Pub. No.: WO2011/081446
PCT Pub. Date: Jul. 7, 2011

(65) Prior Publication Data
US 2012/0231223 A1    Sep. 13, 2012

(30) Foreign Application Priority Data

Dec. 30, 2009    (KR) .................... 10-2009-0134506

(51) Int. Cl.
| | | |
|---|---|---|
| *B32B 3/30* | (2006.01) | |
| *C08J 7/18* | (2006.01) | |
| *C08J 7/04* | (2006.01) | |
| *C09J 7/02* | (2006.01) | |

(52) U.S. Cl.
CPC ................ *C08J 7/18* (2013.01); *C08J 7/047* (2013.01); *C09J 7/0232* (2013.01); *B32B 3/30* (2013.01); *C08J 2367/02* (2013.01); *C08J 2433/06* (2013.01); *C09J 2201/622* (2013.01); *C09J 2423/046* (2013.01); *C09J 2423/106* (2013.01); *C09J 2433/006* (2013.01); *C09J 2467/006* (2013.01); *C09J 2475/006* (2013.01);
(Continued)

(58) Field of Classification Search
CPC ...... Y10T 428/24521; Y10T 428/24612; C08J 7/047; C08J 7/18; C08J 2433/06; C08J 2376/02; B32B 3/30
See application file for complete search history.

(56) References Cited

U.S. PATENT DOCUMENTS

| | | |
|---|---|---|
| 5,061,535 A | 10/1991 | Kreckel et al. |
| 5,232,784 A | 8/1993 | Kim |

(Continued)

FOREIGN PATENT DOCUMENTS

| | | |
|---|---|---|
| CN | 101378900 A | 3/2009 |
| EP | 2202061 A1 | 6/2010 |

(Continued)

*Primary Examiner* — Donald J Loney
(74) *Attorney, Agent, or Firm* — Dentons US LLP

(57) ABSTRACT

The present invention relates to a release film comprising a base film containing a synthetic resin; an embossing patterns layer that is formed on the base film and has more than one protrusion containing a curing material of a photo curable resin composition, and a method for producing the same, in which the present invention can provide a release film having an excellent workability and an exclusive and beautiful appearance, since the surface roughness of the release film is low.

2 Claims, 2 Drawing Sheets

(52) U.S. Cl.
 CPC .. *C09J 2483/005* (2013.01); *Y10T 428/24521* (2015.01); *Y10T 428/24612* (2015.01)

(56) References Cited

U.S. PATENT DOCUMENTS

| | | | | |
|---|---|---|---|---|
| 7,361,403 | B1 * | 4/2008 | Lowe | B32B 27/00 428/353 |
| 2005/0158500 | A1 * | 7/2005 | Kitano | G11B 7/24 428/40.1 |
| 2005/0170126 | A1 * | 8/2005 | Kawabata | B44C 1/165 428/42.1 |
| 2008/0083495 | A1 * | 4/2008 | Sher | B32B 38/06 156/289 |
| 2008/0213527 | A1 * | 9/2008 | Nonaka | B32B 27/32 428/41.8 |
| 2009/0117330 | A1 | 5/2009 | Shiina et al. | |
| 2010/0215911 | A1 * | 8/2010 | Shina et al. | 428/172 |

FOREIGN PATENT DOCUMENTS

| | | |
|---|---|---|
| JP | 02-131175 A | 5/1990 |
| JP | 06-000875 A | 1/1994 |
| JP | 2002-052681 A | 2/2002 |
| JP | 2007-023420 A | 2/2007 |
| JP | 2008-087322 A | 4/2008 |
| JP | 2009-061628 A | 3/2009 |
| JP | 2009-101685 A | 5/2009 |
| KR | 1020050005286 A | 1/2005 |
| KR | 20-0430319 Y1 | 11/2006 |
| KR | 1020070036595 A | 4/2007 |
| KR | 10-2008-0096582 A | 10/2008 |
| KR | 1020080096582 A | 10/2008 |
| KR | 10-2009-0096778 A | 9/2009 |
| WO | 2009/044865 A1 | 4/2009 |

\* cited by examiner

RELEASE FILM AND METHOD FOR MANUFACTURING THE SAME

This application is a National Stage Entry of International Application No. PCT/KR2010/009499, filed Dec. 29, 2010, and claims the benefit of Korean Application No. 10-2009-0134506, filed on Dec. 30, 2009, which is hereby incorporated by reference for all purposes as if fully set forth herein.

TECHNICAL FIELD

The present invention relates to a release film having an embossing patterns layer, and a method for preparing the same.

BACKGROUND ART

For most reflecting sheets, advertising films, interior films and the like, after these behind sides are treated with an adhesion paste for reason of product use, the sides of adhesion paste are protected by using a release paper or a release film. That is, an adhesion sheet is generally produced by producing a material sheet through a rolling and casting, coating an adhesion paste on a release paper, and then combining the side coated with the adhesion paste and the material sheet together.

Formerly, a release paper that is treated with a silicon solution on a paper material has mostly been used to easily delaminate the release paper from the adhesion paste for constructing.

Generally, an adhesion sheet should be made for having an excellent smoothness on the side of release paper to be coated with an adhesion paste in order to uniformly coat with an adhesion paste on the release paper for the uniformity of adhesive strength. In this situation, there was a problem that when the product is attached on the desired adherend, air cannot be leaked so that the surface of sheet is swelled.

In order to solve the above problem, an embossing pattern is given on the surface of a release paper to be coated with an adhesion paste at regular intervals so that the passage, from which air is flowing out of the surface of the release paper, is provided when using the release paper.

However, the release paper having embossing patterns that is formed by the conventional method has a high surface roughness so that there is a problem that can lead to a bad appearance.

The above release paper is now in use in many fields. For example, it is widely used in various industrial fields, including a process for manufacturing something, such as a label including all kinds of stickers, a drug including a disposable band, and the like, a tape for packaging, an asphalt pavement, an auto assembly process, a polyurethane synthetic leather, and the like. Therefore, the developing of the release paper that can maintain exclusive appearances of the above products is required.

DISCLOSURE OF INVENTION

Technical Problem

The present invention is to satisfy a need of the above technical development. An object of the present invention is to provide a release film and a method for producing the same, in which the three-dimensional embossing patterns are formed on the base film containing synthetic resins by using a photo curable resin so that the construction of adhesive sheet can be easily performed, and also the use of the synthetic resin and photo curable resin can allow the surface roughness to be low so that the use of above release film can form an exclusive appearance.

Solution to Problem

The present invention is to provide a base film including a synthetic resin; and a release film having an embossing patterns layer, which is formed on the base film and has more than one protrusion including a curing material of a photo curable resin composition as the means of solving the above object.

In addition, the present invention is to provide a method for producing the release film, in which the method includes a first step for forming embossing patterns by using a photo curable resin on the base film including a synthetic resin; and a second step for curing embossing patterns that is formed in the first step as the means of solving the above object.

Advantageous Effects of Invention

According to the present invention, it can be provided that a release film having embossing patterns, in which the use of the above release film can allow a surface roughness to be low thereby implementing an excellent surface appearance. In addition, the present invention can provide a method for producing the above release film effectively and easily.

BEST MODE FOR CARRYING OUT THE INVENTION

Figure 1:
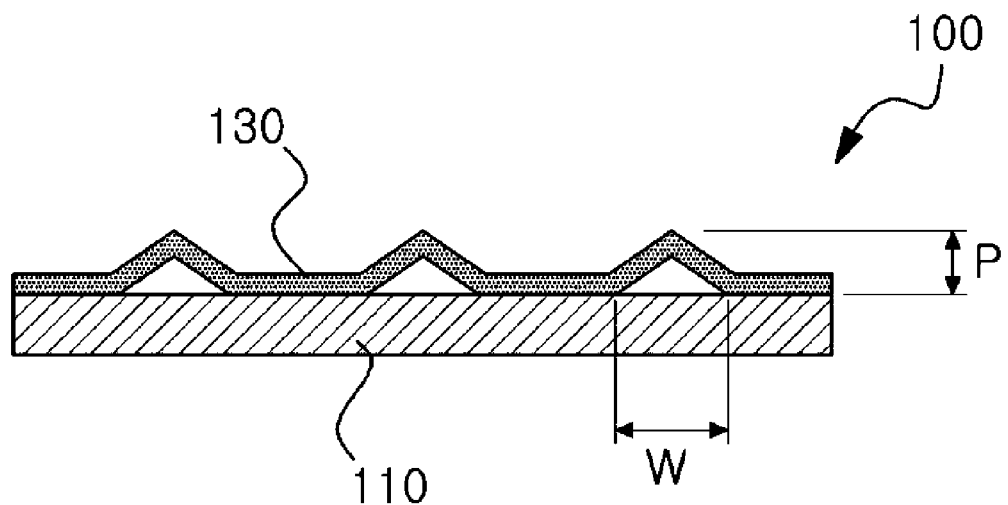
FIG. 1 is a rough diagram showing a cross-sectional structure of a release film according to an embodiment of the present invention.

The present invention relates to a release film including a base film including a synthetic resin; and an embossing patterns layer, which is formed on the base film and has more than one protrusion including a curing material of a photo curable resin composition.

Hereinafter, the release film of the present invention will be described in more detail.

As mentioned above, the release film according to the present invention has a base film including a synthetic resin; and an embossing patterns layer, which is formed on the base film and has more than one protrusion including a curing material of a photo curable resin composition.

Here, the kind of synthetic resins are not limited, but for example it is preferable to use a synthetic resin having a low surface roughness. Specifically, the present invention may use a synthetic resin film including more than one selected from the group consisting of polyethylene terephthalate (PET), polyethylene (PE), polypropylene (PP), polyacrylate, polyurethane and polyester-based resins, for example. More specifically, the present invention may use a synthetic resin film including more than one selected from the group consisting of polyethyleneterephthalate (PET) and polypropylene (PP).

The base film including the above synthetic resin may be produced by a method for forming a film, which is generally known in this field. In addition, since the present invention uses a synthetic resin as a base film, the release film according to the present invention may have a significant low surface roughness as compared with a paper material that has conventionally been used so that the surface roughness of the release film can be significantly decreased.

Meanwhile, the release film according to the present invention has a low surface roughness so that an exclusive appearance can be implemented. For example, the surface roughness (Rt) of the base film that is included in the release film may be less than 3 μm, and specifically less than 1 μm, but is not specifically limited thereto. The lowest limit of the surface roughness (Rt) is not largely limited and may be above 0.1 μm. Here, the surface roughness (Rt) means the maximum value of the surface roughness.

When the surface roughness exceeds 3 μm, it is feared that the surface roughness is very high so that the surface appearance of the adhesive sheet containing the same will be bad.

A method for measuring the surface roughness of the above release film may use methods that are generally used in this field. And it is not limited but for example the surface roughness may be measured by using a measuring machine that is known, such as SJ 301 Model from MITUTOYO Company and may be measured by comparing using Rz that is an average roughness value and Rt that is a maximum roughness value.

The release film according to the present invention is also formed on the base film and has embossing patterns having protrusions, which includes a curing material of the photo curable resin composition.

The kind of the photo curable resin composition that can be used for the present invention is not limited specifically and may use a photo curable resin composition having components that are generally known in this field.

Examples of the photo curable resin composition that can be used for the present invention may include a resin composition including a photo curable oligomer, thinners and photoinitiator.

Examples of the photo curable oligomer may include one or two more mixture of polyester acrylate, epoxy acrylate, polyether acrylate, urethane acrylate, silicon acrylate and acryl-based polymer. The acryl-based polymer among these may be preferably used, but is not limited thereto.

Specific kinds of each oligomer used for the above sentence are specifically limited but the general photo curable resin composition that is known in this field. For example, the condensed reactant of polyester polyol and (meth)acrylic acid may be used as polyester acrylate, the reactant that is reacted by adding (meth)acrylic acid to the epoxy resin may be used as epoxy acrylate, and polyalkyleneglycol di(meth)acrylate, and the like may be used as polyether acrylate.

In addition, the urethane acrylate may be produced by reacting (meth)acrylate including hydroxyl group on urethane prepolymer, in which the end has isocyanate, obtained by reacting polyester-type or polyether-type polyol compound; and isocyanate compound. Specific examples of the isocyanate compound include 2,4-tolylene diisocyanate, 2,6-tolylene diisocyanate, 1,3-xylylene diisocyanate, 1,4-xylylene diisocyanate or diphenylmethane-4,4' diisocyanate, and the like, and examples of (meth)acrylate may include 2-hydroxyethyl(meth)acrylate, 2-hydroxypropyl(meth)acrylate or polyethyleneglycol(meth)acrylate, and the like but are not limited thereto.

In addition, an oilgomer, a partial polymer or a polymer of monomer mixture including an acryl-based monomer may be used as the acryl-based high molecular weight polymer.

The acryl-based high molecular weight polymer according to the present invention may be produced by polymerizing or partially polymerizing the monomer mixture including more than one selected from the group consisting of (meth)acrylic acid alkyl ester; (meth)acrylic acid aryl ester; (poly)alkyleneglycol mono(meth)acrylate, (meth)acrylic acid alkoxyalkyl ester; heterocyclic (meth)acrylate; carboxyl-containing compound; hydroxyl group-containing compound; nitrogen-containing compound; glycidyl group-containing compound; styrene-based compound and carboxylic acid vinyl ester.

Specific examples of the (meth)acrylic acid alkyl ester may include alkyl(meth)acrylate having non-cyclic or cyclic alkyl group or linear or branch of C1 to C20, such as methyl(meth)arylate, ethyl(meth)acrylate, propyl(meth)acrylate, butyl(meth)acrylate, hexyl(meth)acrylate, cyclohexyl(meth)acrylate, 2-ethylhexyl(meth)acrylate, lauryl (meth)acrylate, stearyl(meth)acrylate, octadecyl(meth)acrylate, isooctyl(meth)acrylate, isononyl(meth)acrylate, isodecyl(meth)acrylate, dodecyl(meth)acrylate, methycycliohexyl(meth)acrylate, isobornyl(meth)acrylate, and the like. Examples of (meth)acrylic acid aryl ester may include aryl(meth)acrylate, such as phenyl(meth)acrylate, benzyl (meth)acrylate, chlorophenyl(meth)acrylate, methoxyphenyl(meth)acrylate, bromophenyl(meth)acrylate or phenxyethyl(meth)acrylate and the like. Examples of (poly) alkyleneglycol mono(meth)acrylate may include ethyleneglycol mono(meth)acrylate, 1,3-propyleneglycol (meth)acrylate polyethyleneglycol mono(meth)acrylate, and the like. Examples of (meth)acrylic acid alkoxyalkyl ester may include alkoxyalkyl(meth)acrylate, such as methoxymethyl(meth)acrylate, ethoxymethyl(meth)acrylate, ethoxyethoxyethyl(meth)acrylate, propoxyethyl(meth)acrylate, butoxyethyl(meth)acrylate or ethoxypropyl(meth)acrylate. Examples of heterocyclic(meth)acrylate may include tetrahydrofurfuryl(meth)acrylate, and the like.

In addition, examples of carboxyl group-containing compound may include carboxyethyl(meth)acrylate, (meth)acrylic acid, 2-(meth)acryloyloxy acetic acid, 3-(meth)acryloyloxy propylic acid, 4-(meth)acryloyloxy butyric acid, acrylic acid dimmer, itaconic acid, malic acid, anhydrous malic acid, and the like. Examples of hydroxy group-containing compound may include 2-hydroxy ethyl(meth)acrylate, 2-hydroxypropyl(meth)acrylate, 4-hydroxybutyl (meth)acrylate, 6-hydroxyhexyl(meth)acrylate, 8-hydroxyoctyl(meth)acrylate, 2-hydroxyethyleneglycol (meth)acrylate, 2-hydroxypropyleneglycol(meth)acrylate, and the like. Examples of nitrogen-containing monomer may include (meth)acrylamide, dimethylaminopropyl(meth) acrylamide, (meth)acrylonitril, (meth)acryloylmorphorine, n-substituted (meth)acrylamide (ex. N-methylol(meth)acrylamide), and the like. Examples of glycidyl group-containing compound may include glycidyl(meth)acrylate, and the like, examples of styrene-based compound may include styrene, alpha methyl styrene, and the like, and examples of carbonic acid vinyl ester may include vinyl acetate, and the like, but are not limited thereto.

Also, the monomer mixture that constitutes the acryl-based high molecular weight polymer according to the present invention may further include multi-functional acrylate in the above-mentioned component. The kind of multi-functional acrylate that can be used for the present invention may be not limited specifically. The present invention may use as follows, but is not limited thereto: for example, di-functional acrylate, such as butanediol di(meth)acrylate, pentanediol di(meth)acrylate, hexandiol di(meth)acrylate, neopentylglycol di(meth)acrylate, polyethyleneglycol di(meth)acrylate, diethyleneglycol di(meth)acrylate, triethyleneglycol di(meth)acrylate, dipropyleneglycol di(meth)acrylate, neopentylglycol adipate di(meth)acrylate, hydroxyl puivalic acid neopentylglycol di(meth)acrylate, dicyclopentanyl di(meth)acrylate, caprolactone modified dicyclopentenyl di(meth)acrylate, ethyleneoxide modified di(meth)acrylate, di(meth)acryloxy ethyl isocyanurate, allylation cyclohexyl di(meth)acrylate, tricyclodecandimethanol(meth)acrylate, dimethylol dicyclopentane di(meth)acrylate, ethyleneoxide modified hexahydrophthalic acid di(meth)acrylate, tricyclodecan dimethanol(meth)acrylate, neopentylglycol modified trimethylpropane di(meth)acrylate, adamantine di(meth)acrylate, 9,9-bis[4-(2-acryloyloxyethoxy)phenyl]fluorine, and the like; 3-functional acrylate, such as trimethylolpropane tri(meth)acrylate, dipentaerythritol tri(meth)acrylate, propionic acid modified dipentaerythritol tri(meth)acrylate, pentaerythritol tri(meth)acrylate, glycerin tri(meth)acrylate, propyleneoxide modified trimethylolpropane tri(meth)acrylate, 3-functional urethane (meth)acrylate, tris(meth)acryloxyethylisocyanurate, and the like; 4-functional acrylate, such as diglycerin tetra(meth)acrylate, pentaerythritol tetra(meth)acrylate, and the like; 5-functional acrylate, such as proponic acid modified dipentaerythritol tetra(meth)acrylate, and the like; and 6-functional acrylate, such as dipentaerythritol hexa(meth)acrylate, caprolactone modified dipentaerythritol hexa(meth)acrylate, urethane(meth)acrylate (ex. Reactant of isocyanate monomer and trimethylolpropane tri(meth)acrylate), and the like.

For the present invention, when combining more than two monomers containing the monomer mixture among all kinds of monomers as mentioned above, their ratios are not limited specifically, and can be freely selected according to the desired features.

A method for producing the acryl-based high molecular weight polymer using the above-mentioned monomer mixtures according to the present invention may be not limited specifically, and for example the acryl-based high molecular weight polymer can be produced by polymerizing or partially polymerizing the monomer mixtures using the general process, such as a bulk polymerization, and the like.

The photo curable resin composition according to the present invention may include a thinner together with the above-mentioned oligomer. The thinner may improve workability by modulating the viscosity of the resin composition or may be part of the curable structure by addition polymerization or crosslinking on the cure reaction.

More than one selected from the group consisting of acryl-based monomer, urethane-based acrylate-based monomer, epoxy acrylate-based monomer, vinyl-based monomer, and the like may be used as a specific example of the above thinner that can be used for the present invention. The acryl-based monomer among them is preferably used, and specifically mono-functional or multi-functional acrylate may be used, but may be limited thereto.

The mono-functional or multi-functional acrylate may be properly selected from acrylic acid alkyl ester; (meth)acrylic acid aryl ester; (poly)alkyleneglycol mono(meth)acrylate, (meth)acrylic acid alkoxyalkyl ester; heterocyclic (meth)acrylate; and multi-functional acrylate, for example as mentioned above considering the reaction purpose.

In addition, the photo curable initiator that is known in this field and is included in the photo curable resin composition according to the present invention may be used as the photo curable initiator, and for example the photo curable initiator may be used by combining more than one or two of the compounds of benzoin ether-based, acetophenone-based, anthraquinone-based, thioxanthone-based, ketal-based, benzophenone-based, and the like.

More specifically, examples of benzoin ether-based compound may include benzoin, benzoin methyl ether, benzoin ethyl ether, benzoin isopropyl ether, benzoin n-butyl ether, benzoin phenyl ether, and the like and examples of acetophenone-based compound may include acetophenone, 2,2-diethoxy acetophenone, 2,2-dimethoxy-2-phenyl acetophenone, 2,2-diethoxy-2-phenyl acetophenone, 1,1-dichloroacetophenone, 1-hydroxy cyclohexyl phenylketone, and the like.

In addition, examples of the anthraquinone-based compound may include 2-methyl anthraquinone, 2-amyl anthraquinone, and the like, examples of the thioxanthone-based compound may include 2,4-dimethyl thioxanthone, 2,4-diethyl thioxanthone, 2-chlorothioxanthone, 2,4-diisopropyl thioxanthone, 1-chloro-4-propoxy thioxanthone, and the like, and examples of the ketal-based compound may include benzophenone, diethylamino benzophenone, 4,4'bis-diethylaminobenzophenone, 3,3-dimethyl-4-methoxy benzophenone, 3,3',4,4'-tetra-(t-butyl peroxyl carbonyl)benzophenone, and the like.

Moreover, 4-benzoyl-4'-methyl diphenyl sulfide, xanthones, 2-methyl-1-[4-(methylthio)phenyl]-2-morpholino-1-propane-1-one, 2-benzyl-2-dimethylamino-1-(4-morpholinophenyl)-buthane-1-one 2,4,6-trimethyl benzoyldiphenyl phosphineoxide, and the like.

Also, the photo curable resin used for the present invention may further include various additives that are known in this field in addition to the reactive oligomer, the reactive thinner, and the photo initiator, and for example may further include a photopolymerization accelerator or sensitizer, such as p-dimethyl aminobenzoic acid isoamyl ester, 2-dimethyl aminoethyl benzoate, and the like.

A method for producing the above photopolymerization resin composition in the present invention is not limited specifically. For example, the present invention may produce a resin composition by mixing the oligomers, such as the above-mentioned polyester acrylate, epoxy acrylate, polyether acrylate, urethane acrylate, silicon acrylate, and the like with an additive, such as a thinner, a photo initiator, and the like. In addition, in the case of composing the resin composition with the above acryl-based high molecular weight polymer according to the present invention, for example the monomer mixture containing the monomer to compose the acryl-based high molecular weight polymer and the monomer to be used as a thinner may be partially polymerized with the process, such as the radical bulk polymerization, and the like to produce the polymer mixed with high molecular weight polymer and thinner, and then other additive, such as a photo initiator may be added to the above polymer to produce the resin composition.

In addition, the contents of the materials that are included in the photo curable resin composition are not limited specifically, but for example the thinner may be included in 10 to 4000 parts by weight and the photo polymerization initiator may be included in 0.1 to 5 parts by weight based on 100 parts by weight of the photo curable oligomer.

Meanwhile, the embossing patterns according to the present invention means the layer that is formed with three-dimensional embossing patterns formed by using the photo curable resin composition. In this case, the shape and size of the embossing patterns are not limited specifically, may be properly controlled according to the use of release film, and for example may be the shape having a protrusion of regular patterns as depicted in FIG. 1 to FIG. 4. The protrusion may be patterned in a channel shape or a dot shape on the flat surface of release film. The highest height (P) of the protrusions in the embossing patterns may be 1 to 20 μm and the width of the base side (W) may be 100 to 500 μm. More specifically, the height of the protrusions may be 5 to 15 μm and the width of the base side may be 200 to 400 μm.

FIG. 1 is a rough diagram showing a cross-section of a release film according to an embodiment of the present invention. As shown in FIG. 1, the release film 100 according to an embodiment of the present invention may have the layer 130 having embossing patterns on the base film 110.

Meanwhile, the release film according to the release film may further include a release-treating layer formed on the embossing patterns.

The release-treating layer is formed on the layer of embossing patterns for the release treating, has a high detachability, and for example may include a silicon material.

The silicon material may not be limited, may include all the silicon materials that are known in this field, and for example may include alkenyl group-containing organopolysiloxane, organohydrogenpolysiloxane, and the like.

Here, the alkenyl group may specifically be vinyl group, propenyl group, butenyl group, pentenyl group, hexenyl group, and the like. The organopolysiloxane may specifically be dimethylvinylsiloxy, of which dimethylpolysiloxy groups in both ends of molecular chain are blocked; dimethylsiloxane-methylvinylsiloxane copolymer, of which dimethylvinylsiloxane group in both ends of molecular chain are blocked; dimethylsiloxane-methylphenylsiloxane copolymer, of which dimethylvinylsiloxy groups in both ends of molecular chain are blocked; methylvinylpolysiloxane, of which trimethylsiloxy groups in both ends of molecular chain are blocked; dimethylsiloxane-methylvinylsiloxane copolymer, of which trimethylsiloxy groups in both ends of molecular chain are blocked; dimethylsiloxane-methyl(5-hexenyl)siloxane copolymer, of which trimethylvinylsiloxy group in both ends of molecular chain are blocked; dimethylsiloxane-methylvinylsiloxane-methylphenylsiloxane copolymer, of which dimethylvinylsiloxy group in both ends of molecular chain are blocked; methylvinylpolysiloxane, of which dimethylhydroxy group in both ends of molecular chain are blocked; dimethylsiloxane-methylvinylsiloxane copolymer, of which dimethylhydroxy groups in both ends of molecular chain are blocked; and the like.

One or more than two of materials, which are divided into the alkenyl group-containing organopolysiloxane as exemplified above, may be mixed.

In addition, the silicon material may further include a platinum-based curing catalyst in addition to the above materials. Examples of the platinum-based curing catalyst may include chloroplatinic acid, alcohol solution of chloroplatinic acid, complex of chloroplatinic acid and olefin, complex of chloroplatinic acid and vinyl siloxane, complex of chloroplatinic acid and kinds of ketone, fine powder of aluminum oxide that is impregnated with platinum, fine powder of silica that is impregnated with platinum, platinum black, and the like.

One or more than two of the platinum-based curing catalyst as exemplified above may be included in the release treating layer.

Figure 2:
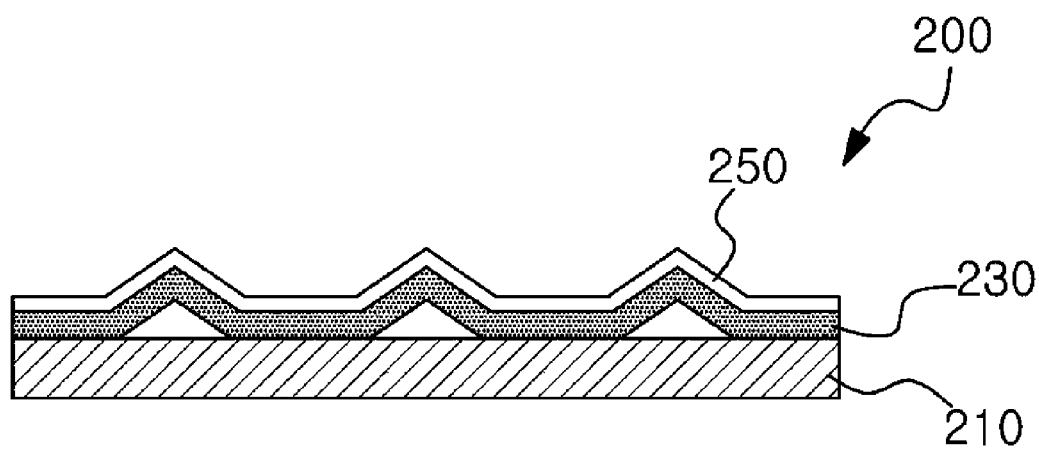
FIG. 2 is a rough diagram showing a cross-sectional structure of a release film according to other embodiment of the present invention.

FIG. 2 is a rough diagram showing a cross-section of the release film according to an embodiment of the present invention. Referring to FIG. 2, the release film 200 according to an embodiment of the present invention may further include the release-treating layer 250 that is formed on the embossing patterns layer 230 in addition to the base film 210 and the embossing patterns layer 230.

Meanwhile, the release film according to the present invention may further include a first primer layer that is formed between the base film and the embossing patterns layer.

Here, the first primer layer plays a role of forming the smooth surface for more powerful adhesion of the embossing patterns layer that is formed on the base film. The kinds of the first primer layer are not limited specifically, but may include more than one selected from the group consisting of polyacrylate resin, polyester resin, polyolefin resin and polyurethane resin.

Figure 3:
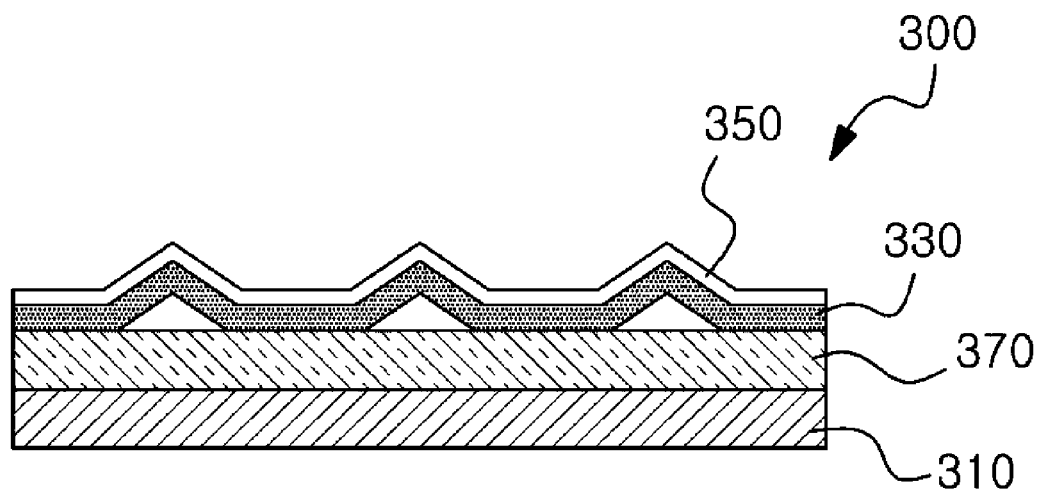
FIG. 3 is a rough diagram showing a cross-sectional structure of a release film according to another embodiment of the present invention.

FIG. 3 is a rough diagram showing a cross-section of the release film according to another embodiment of the present invention. Referring to FIG. 3, the release film 300 according to another embodiment of the present invention includes the base film 310, the embossing patterns layer 330 and the release-treating layer 350, and the first primer layer 370 may further be included between the base film 310 and the embossing patterns layer 330.

In addition, the release film according to the present invention may further include a second primer layer that is formed on the underside of the base film.

The second primer layer plays a role of protecting the underside of the base film, and the kinds of the second primer layer are not limited specifically, but for example may include more than one selected from the group consisting of polyethylene resin, polypropylene resin, acrylate resin, polyurethane resin, silicon resin and polyester resin.

Figure 4:
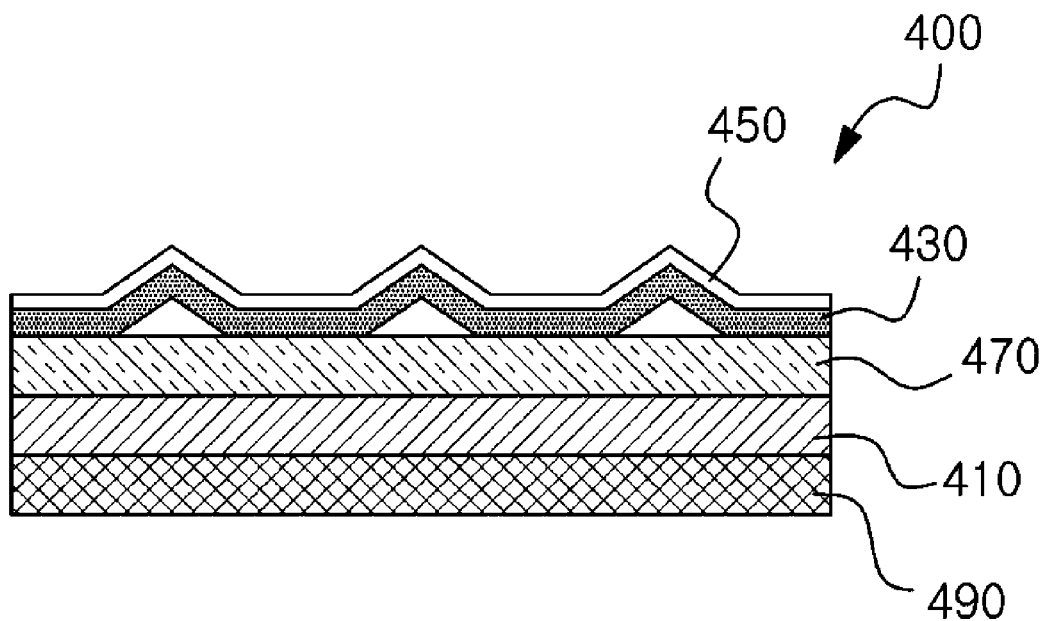
FIG. 4 is a rough diagram showing a cross-sectional structure of a release film according to another embodiment of the present invention.

FIG. 4 is a rough diagram showing the cross-sectional structure of the release film according to another embodiment of the present invention. Referring to FIG. 4, the release film 400 according to another embodiment of the present invention include the base film 410, the first primer layer 470, the embossing patterns layer 430 and the release-treating layer 450 and the second primer layer 490 may further be included on the underside of the base film 410.

In addition, the present invention relates to a method for producing the release film, comprising a first step for forming the embossing patterns using the photo curable resin on the base film containing the synthetic resin; and a second step for curing the embossing patterns formed in the first step.

The first step is the step for forming the embossing patterns using the photo curable resin on the base film as mentioned above.

For the first step, the embossing patterns may be formed by using various coating methods that are known in this field, and the kinds of the coating methods are not limited specifically, but for example may include any one of coating method selected from the group consisting of a direct grinding coating, an offset coating and a screen coating. Specifically, the coating may be performed using any one of method selected from the group consisting of a direct grinding coating, a reverse grinding coating, a gravure offset coating, a micro-gravure coating, a silk screen coating, a rotary screen coating, a direct roll coating, a reverse roll coating, a curtain roll coating, a knife coating, an air knife coating, a bar coating, and the like. More specifically, the coating may be performed using any one of method selected from the group consisting of a gravure coating and a direct roll coating.

Meanwhile the second step is the step for curing the photo curable resin containing the embossing patterns layer.

That is, the step is for the ultraviolet irradiation in order to cure the photo curable resin, and may use all the light sources that can apply for curing the photo curable resin. And the light sources and the conditions of photo curing are not limited specifically, but for example, the photo curing in the second step may be performed by irradiating with UV light having 300 to 450 nm for 0.1 to 120 seconds on the photo curable resin that is coated according to the embossing patterns.

Figure 5:
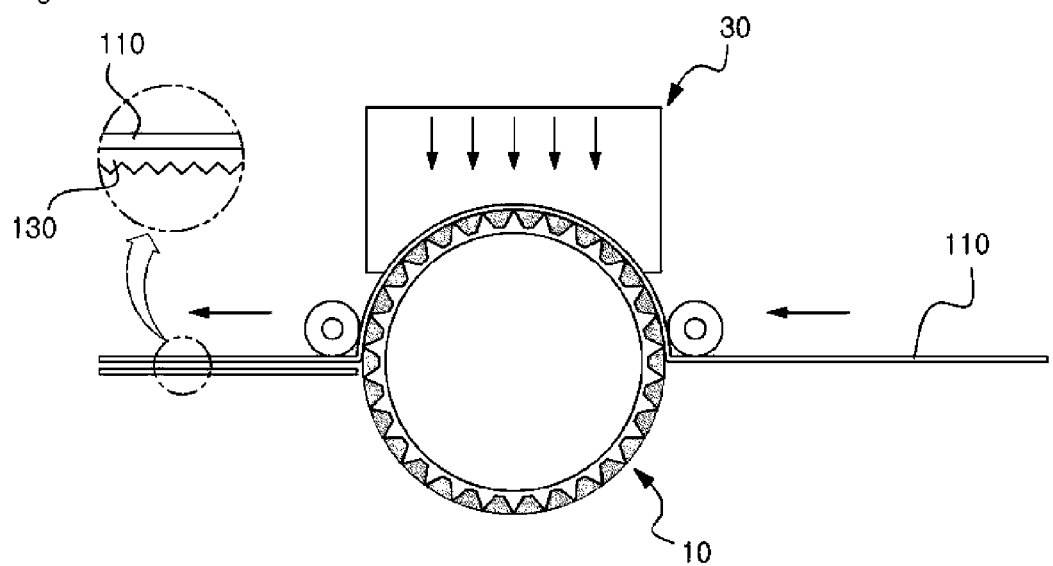
FIG. 5 is a rough process chart showing a method for producing a release film according to an embodiment of the present invention.

Hereinafter, the method for producing the release film according to an embodiment of the present invention will be described in more detail with reference to FIG. 5.

Firstly, while the base film 110 was passed on the roller 10 that has the embossing patterns using a guide roller, the photo curable resin that was filled in the embossing patterns of the roller was coated on the base film 110 according to the embossing patterns.

Since then, the embossing patterns were cured by irradiating ultraviolet using a ultraviolet irradiation device 30 while the base film 110 having the embossing patterns was continuously moved toward the roller 10.

From the above procedures, the release film having the embossing patterns layer 130 that is formed on the base film 110 may be produced.

However, the above procedures are only examples, and the method for producing the release film according to the present invention is not limited thereto.

MODE FOR THE INVENTION

Example

Hereinafter, the present invention will be described in more detail with reference to accompanying examples according to the present invention and comparative examples not according to the present invention, but the range of the present invention is not limited to the following examples.

Preparation Example 1

Preparation of Photo Curable Resin

The monomer mixture containing 50 parts by weight of methylmethacrylate, 49.8 parts by weight of ethylacrylate, 0.2 parts by weight of hexanedioldiacrylate and 0.1 parts by weight of AIBN initiator was polymerized through a bulk radical polymerization at 60° C. for 1 hour to produce the partial polymer that is mixed of the photo curable oligomer and thinner of monomer type. The content of photo curable oligomer in the partial polymer was 10 parts by weight and the content of thinner was 90 parts by weight. The content of the photo curable oilgomer was measured by weighting the components remained after volatizing the monomer components that were used as a thinner from the dried polymer obtained by drying 1 g of the partial polymer obtained from the bulk radical polymerization at 150° C. for 60 minutes.

Since then, the produced partial polymer was added with 0.5 parts by weight of 2,4,6-trimethyl benzoilphenyl phosphineoxide (BASF) based on 100 parts by weight of total solid to produce the photo curable resin.

Preparation Example 2

Preparation of Silicone Release-Treating Solution 100 parts by weight of Syl-Off Q 2-7784 and 3 parts by weight of Syl-Off Q 2-7560 from Dow Corning were combined to produce a silicone release-treating solution.

Example 1

PET film (from SKC, SH22), of which the surface was treated with acryl resin and the thickness was 75 μm, and a gravure coating roll having embossing patterns, of which an average deep of a concave part was 5 μm, were prepared. Since then, the photo curable resin prepared from Preparation Example 1 was filled in the concave part of the gravure coating roll and the PET film was moved to the gravure coating roll through the guide roller. While the PET film was adhered to the gravure coating roll, the printing was progressed to coat the photo curable resin composition on the PET film so that the embossing patterns layer having the embossing patterns was produced.

In addition to the above procedures, the embossing patterns was dried by irradiating ultraviolet using a ultraviolet mercury lamp on the upper part of the gravure coating roll, and then the PET film and cured embossing patterns layer were isolated from the gravure roll. The silicone release-treating solution prepared from Preparation Example 2 was applied on the cured embossing patterns using the bar coater in 10 μm of thickness and then dried at 100° C. for 2 minutes.

From the above procedures, the release film according to Example 1 was produced.

Comparative Example 1

The release paper according to Comparative Example 1 was produced under the conditions similar to that of Example 1, except using a paper instead of the PET film that was used as the base film in Example 1.

Test Example

Measurement of Surface Roughness

The surface roughness of the release film according to Example 1 and the surface roughness of the release paper according to Comparative Example 1 were measured using SJ 301 model from MITUTOYO. The results were shown in the following Table 1.

TABLE 1

|  | Ra(μm) | Rt(μm) |
| --- | --- | --- |
| Example 1 | 1.0 | 6.0 |
| Comparative Example 1 | 4.5 | 10.0 |

As shown in the above Table 1, the maximum surface roughness (Rt) and the average surface roughness (Ra) of Example 1 were lower than that of Comparative Example 1, so that the appearance of release film can be exclusively implemented.

The invention claimed is:
1. A release film, comprising:
a base film containing a synthetic resin including more than one selected from the group consisting of poly- ethyleneterephthalate, polyethylene, polypropylene, polyacrylate, polyurethane and polyester-based resin;

an embossing patterns layer that is formed on the base film and has more than one protrusion containing a curing material of a photo curable resin composition including a photo curable oligomer, a thinner and a photopolymerization initiator;

a silicon release-treating layer that is formed on the embossing patterns layer;

a first primer layer that is formed between the base film and the embossing patterns layer; and a second primer layer that is formed on the base film opposite to the embossing patterns layer, wherein a surface roughness (Rt) of the base film is less than 3 μm, wherein the maximum height of the protrusion is 1 to 20 μm and the width of the base side is 100 to 500 μm, wherein the first primer layer includes more than one selected from the group consisting of polyacrylate resin, polyester resin, polyolefin resin and polyurethane resin and the second primer layer includes more than one selected from the group consisting of polyethylene resin, polypropylene resin, acrylate resin, polyurethane resin, silicon resin and polyester resin, and wherein the photo curable oligomer includes more than one selected from the group consisting of polyester acrylate, epoxy acrylate, urethane acrylate and silicon acrylate.

2. A method for producing the release film of claim 1, comprising:

a first step for forming embossing patterns using a photo curable resin on a base film containing a synthetic resin by any one of coating methods selected from the group consisting of a direct gravure coating, a reverse gravure coating, a gravure offset coating, a micro-gravure coating, a silk screen coating, a rotary screen coating, a knife coating, a bar coating and a direct roll coating; and a second step for curing the embossing patterns that are formed in the first step by irradiating ultraviolet having 300 to 450 nm wavelengths on the embossing patterns for 0.1 seconds to 120 seconds, wherein a surface roughness (Rt) of the base film is less than 3 μm, and wherein the maximum height of the protrusion is 1 to 20 μm and the width of the base side is 100 to 500 μm.

* * * * *